US011401923B2

(12) United States Patent
Hayama et al.

(10) Patent No.: US 11,401,923 B2
(45) Date of Patent: Aug. 2, 2022

(54) CAPACITY CONTROL VALVE

(71) Applicant: EAGLE INDUSTRY CO., LTD., Tokyo (JP)

(72) Inventors: Masahiro Hayama, Tokyo (JP); Yoshihiro Ogawa, Tokyo (JP); Keigo Shirafuji, Tokyo (JP); Kohei Fukudome, Tokyo (JP); Takahiro Ejima, Tokyo (JP); Daichi Kurihara, Tokyo (JP); Wataru Takahashi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 56 days.

(21) Appl. No.: 16/967,693

(22) PCT Filed: Feb. 14, 2019

(86) PCT No.: PCT/JP2019/005200
§ 371 (c)(1),
(2) Date: Aug. 5, 2020

(87) PCT Pub. No.: WO2019/159999
PCT Pub. Date: Aug. 22, 2019

(65) Prior Publication Data
US 2021/0033082 A1    Feb. 4, 2021

(30) Foreign Application Priority Data
Feb. 15, 2018 (JP) .............................. JP2018-025443

(51) Int. Cl.
*F04B 27/18* (2006.01)
*F16K 3/26* (2006.01)

(52) U.S. Cl.
CPC ............ *F04B 27/1804* (2013.01); *F16K 3/26* (2013.01); *F04B 2027/1813* (2013.01);
(Continued)

(58) Field of Classification Search
CPC .. F04B 27/1009; F04B 27/16; F04B 27/1804; F04B 2027/1813; F04B 2027/1827;
(Continued)

(56) References Cited

U.S. PATENT DOCUMENTS 3,297,048 A * 1/1967 Imhof ..................... B60T 17/22
                                                                137/557
4,905,477 A * 3/1990 Kazuhiko ............. F04B 49/225
                                                                62/196.3
(Continued)

FOREIGN PATENT DOCUMENTS

CN    111684156    9/2020    ............. F04B 27/18
EP      1091124   11/2001    ............. F04B 27/18
(Continued)

OTHER PUBLICATIONS

International Preliminary Report on Patentability issued in PCT/JP2019/005200, dated Aug. 27, 2020, 7 pages.
(Continued)

*Primary Examiner* — Devon C Kramer
*Assistant Examiner* — Joseph S. Herrmann
(74) *Attorney, Agent, or Firm* — Hayes Soloway P.C.

(57) ABSTRACT

A capacity control valve includes: a valve housing having a Pc port, a Ps port and a Pd port; a main valve element which includes a main valve portion coming contacting and separating from a main valve seat opening and closing communication between the Pd port and the Pc port by a drive force of a solenoid; an intermediate communication path communicating the Pc port with the Ps port; and a pressure-sensitive valve opening and closing the intermediate communication path by an ambient pressure, in which the valve housing have a differential pressure valve housed therein, the differential pressure valve including a differential pressure valve element and opening and closing a communication between
(Continued)

the Pc port and the Ps port by the differential pressure valve element moved by an operation force of an operation member operated by a discharge pressure Pd from the Pd port.

20 Claims, 7 Drawing Sheets

(52) U.S. Cl.
CPC ............... *F04B 2027/1822* (2013.01); *F04B 2027/1827* (2013.01); *F04B 2027/1845* (2013.01); *F04B 2027/1872* (2013.01)

(58) Field of Classification Search
CPC ...... F04B 2027/1831; F04B 2027/1859; F04B 2027/1822; F04B 2027/1845; F04B 2027/1872; F16K 3/26; F16K 17/30
See application file for complete search history.

(56) References Cited

U.S. PATENT DOCUMENTS

| | | | | |
|---|---|---|---|---|
| 5,105,852 | A * | 4/1992 | Wagner | F04B 37/08 137/625.33 |
| 6,010,312 | A | 1/2000 | Suitou et al. | 417/222.2 |
| 6,354,811 | B1 | 3/2002 | Ota et al. | 417/222.2 |
| 6,358,017 | B1 | 3/2002 | Ota et al. | 417/222 |
| 6,361,283 | B1 | 3/2002 | Ota et al. | 417/222.2 |
| 6,457,319 | B1 | 10/2002 | Ota et al. | 62/228.3 |
| 6,485,267 | B1 * | 11/2002 | Imai | F04B 27/1804 417/222.2 |
| 7,644,729 | B2 | 1/2010 | Cho | F04B 27/1804 |
| 8,021,124 | B2 * | 9/2011 | Umemura | F04B 27/1804 251/333 |
| 9,181,937 | B2 | 11/2015 | Ota | F04B 27/1804 |
| 9,777,863 | B2 * | 10/2017 | Higashidozono | F16K 31/0624 |
| 11,156,301 | B2 * | 10/2021 | Hayama | F16K 31/0627 |
| 2004/0060604 | A1 | 4/2004 | Uemura et al. | 137/595 |
| 2006/0218953 | A1 | 10/2006 | Hirota | 62/228.5 |
| 2009/0183786 | A1 | 7/2009 | Iwa et al. | 137/487.5 |
| 2012/0056113 | A1 * | 3/2012 | Tano | F04B 27/1804 251/25 |
| 2012/0198992 | A1 | 8/2012 | Futakuchi et al. | 91/505 |
| 2013/0291963 | A1 | 11/2013 | Futakuchi et al. | B60H 1/00485 |
| 2015/0211506 | A1 | 7/2015 | Shirafuji et al. | F04B 27/1804 |
| 2015/0345655 | A1 * | 12/2015 | Higashidozono | F04B 27/1804 137/624.27 |
| 2018/0363637 | A1 | 12/2018 | Kanai et al. | F04B 27/1804 |
| 2021/0033081 | A1 * | 2/2021 | Hayama | F16K 17/048 |

FOREIGN PATENT DOCUMENTS

| | | | | |
|---|---|---|---|---|
| EP | 2 784 320 | | 10/2014 | ............. F04B 27/18 |
| EP | 3 431 760 | | 1/2019 | ............. F04B 27/18 |
| EP | 3744978 | | 2/2020 | ............. F04B 27/18 |
| JP | 5-306679 | | 11/1993 | ............. F04B 27/08 |
| JP | 6-200875 | | 7/1994 | ............. F04B 27/08 |
| JP | 2000-345961 | | 12/2000 | ............. F04B 27/14 |
| JP | 2001-73939 | | 3/2001 | ............. F04B 27/14 |
| JP | 2001-132632 | | 5/2001 | ............. F04B 27/14 |
| JP | 2006-52648 | | 2/2006 | ............. F04B 27/14 |
| JP | 2006-307828 | | 11/2006 | ............. F04B 27/14 |
| JP | 4242624 | | 1/2009 | ............. F04B 49/00 |
| JP | 4700048 | | 3/2011 | ............. F04B 49/00 |
| JP | 5167121 | | 12/2012 | ............. F04B 27/14 |
| JP | 5557901 | | 6/2014 | ............. F04B 27/14 |
| JP | 2014-190247 | | 10/2014 | ............. F04B 27/14 |
| JP | 2017-129042 | | 7/2017 | ............. F04B 27/18 |
| JP | 6206274 | | 10/2017 | ............. F04B 27/18 |
| JP | 2018-40385 | | 3/2018 | ............. F16K 31/06 |
| WO | WO 2005095796 | | 10/2005 | ............. F04B 27/14 |
| WO | WO-2005095796 | A1 * | 10/2005 | ......... F04B 27/1804 |
| WO | WO 2007/119380 | | 10/2007 | ............. F04B 27/14 |
| WO | WO 2014/091975 | | 6/2014 | ............. F04B 27/14 |
| WO | WO 2014/119594 | | 8/2014 | ............. F04B 27/14 |
| WO | WO 2017/057160 | | 4/2017 | ............. F04B 27/18 |
| WO | WO 2017/159553 | | 9/2017 | ............. F04B 27/18 |

OTHER PUBLICATIONS

International Search Report and Written Opinion issued in PCT/JP2019/005200, dated Apr. 23, 2019, with English translation, 12 pages.
European Search Report issued in corresponding European Patent Application Serial No. 19760096.8, dated Oct. 5, 2021, 9 pages.
Official Action issued in related U.S. Appl. No. 16/967,692, dated Oct. 4, 2021, 34 pages.
Chinese Official Action issued in related Application Serial No. 201980008650.1, dated Aug. 19, 2021, with translation, 8 pages.
Chinese Official Action issued in related Application Serial No. 201980012733.8, dated Sep. 2, 2021, with translation, 9 pages.
Chinese Official Action issued in related Application Serial No. 201980011652.6, dated Sep. 1, 2021, with translation, 10 pages.
Chinese Official Action issued in related Application Serial No. 201980011570.1, dated Sep. 3, 2021, with translation, 11 pages.
Korean Official Action issued in related Application Serial No. 10-2020-7024987, dated Sep. 17, 2021, with translation, 12 pages.
U.S. Appl. No. 17/259,138, filed Jan. 8, 2021, Hayama et al.
U.S. Appl. No. 17/258,708, filed Jan. 7, 2021, Hayama et al.
U.S. Appl. No. 17/258,692, filed Jan. 7, 2021, Hayama et al.
U.S. Appl. No. 17/256,947, filed Dec. 29, 2020, Hayama et al.
U.S. Appl. No. 17/256,955, filed Dec. 29, 2020, Hayama et al.
U.S. Appl. No. 17/256,959, filed Dec. 29, 2020, Hayama et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,692, filed Aug. 5, 2020, Hayama et al.
U.S. Appl. No. 16/962,786, filed Jul. 16, 2020, Hayama et al.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.

(56) References Cited

OTHER PUBLICATIONS

International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Whitten Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
European Search Report issued in corresponding European Patent Application Serial No. 19754335.8, dated Jun. 21, 2021, 11 pages.
European Search Report issued in corresponding European Patent Application Serial No. 19754129.8, dated Jun. 18, 2021, 12 pages.
European Search Report issued in corresponding European Patent Application Serial No. 19744514.1, dated Sep. 6, 2021, 9 pages.
Official Action issued in related U.S. Appl. No. 16/962,786, dated Jun. 24, 2021, 19 pages.
Notice of Allowance issued in related U.S. Appl. No. 16/962,786, dated Aug. 5, 2021, 4 pages.

* cited by examiner

CAPACITY CONTROL VALVE

TECHNICAL FIELD

The present invention relates to a capacity control valve for variably controlling a capacity or a pressure of a working fluid and relates to, for example, a capacity control valve for controlling a discharge amount of a variable displacement compressor used in an air conditioning system of an automobile in response to a pressure.

BACKGROUND ART

A variable displacement compressor used in an air conditioning system of an automobile or the like includes a rotating shaft rotationally driven by an engine, a swash plate connected the rotating shaft so that an inclination angle is variable, a compression piston connected to the swash plate, and the like and changes the inclination angle of the swash plate so that a stroke amount of the piston is changed to control a discharge amount of a fluid. The inclination angle of the swash plate can be changed continuously by appropriately controlling a pressure inside a control chamber while using a suction pressure Ps of a suction chamber sucking a fluid by using a capacity control valve driven to be opened and closed by an electromagnetic force, a discharge pressure Pd of a discharge chamber discharging a fluid pressurized by the piston, and a control pressure Pc of the control chamber accommodating the swash plate.

When the variable displacement compressor is driven continuously (hereinafter, simply referred to as a "continuous driving state"), the capacity control valve is energized by a control computer and performs normal control in which a main valve element is moved in the axial direction by an electromagnetic force generated in a solenoid and a main valve is opened and closed to adjust the control pressure Pc by supplying a pressure of the discharge chamber to the control chamber.

During normal control of the capacity control valve, the pressure of the control chamber of the variable displacement compressor is appropriately controlled and the inclination angle of the swash plate with respect to the rotating shaft is continuously changed to change the stroke amount of the piston so that the discharge amount of the fluid with respect to the discharge chamber is controlled and the air conditioning system is adjusted to have desired cooling capacity.

In such a variable displacement compressor, when the variable displacement compressor is stopped and is left in a stop state for a long time, the suction pressure Ps, the discharge pressure Pd, and the control pressure Pc of the variable displacement compressor are equalized, the control pressure Pc and the suction pressure Ps are much higher than the control pressure Pc and the suction pressure Ps in the continuous driving state, and a part of the fluid inside the control chamber is liquefied. When operating the variable displacement compressor from this state, since the control pressure Pc is much higher than that in the continuous driving state and the control chamber cannot easily have a maximum capacity due to the liquefied fluid, it takes a long time until the discharge amount is controlled to a target value. Thus, there is known a capacity control valve that discharges a liquefied fluid from the inside of the control chamber of the variable displacement compressor in a short time when starting the variable displacement compressor.

A capacity control valve 100 shown in Patent Citation 1 includes, as illustrated in FIG. 7, a valve housing 110 which includes a first communication path 112 (also called as a Pd port) communicating a first valve chamber 120 provided with a first valve seat 110a (also called as a main valve seat) with a discharge chamber of a variable displacement compressor, a second communication path 113 (also called as a Ps port) communicating a second valve chamber 130 provided with a second valve seat 182a with a suction chamber of the variable displacement compressor, and a third communication path 114 (also called as a Pc port) communicating a third valve chamber 140 (also called as a pressure-sensitive chamber) formed on the side opposite to the second valve chamber 130 in the axial direction with respect to the first valve chamber 120 with a control chamber of the variable displacement compressor, a main valve element 151 which integrally includes a first valve portion 151a (also called as a main valve portion) coming into contact with and separating from the first valve seat 110a in the first valve chamber 120 so as to open and close a communication between the discharge chamber and the control chamber and a second valve portion 151b coming into contact with and separating from the second valve seat 182a in the second valve chamber 130 so as to open and close a communication between the control chamber and the suction chamber and performs an opening and closing operation in the mutually opposite directions by the reciprocating movement, an intermediate communication path 155 which communicates the second valve chamber 130 with the third valve chamber 140, a pressure-sensitive element 160 which is disposed inside the third valve chamber 140 and applies an urging force to the main valve element 151 in a valve opening direction of the main valve in response to an ambient fluid pressure, an adapter 170 which includes an annular pressure-sensitive valve seat 170a provided in a free end of the pressure-sensitive element 160 in the extending and contracting direction so as to come into contact with and separate from a pressure-sensitive valve portion 152a integrally provided in the main valve element 151 and to open and close a communication between the third valve chamber 140 and the intermediate communication path 155, and a solenoid 180 which applies a drive force to the main valve element 151.

When the solenoid 180 of the capacity control valve 100 is energized so that the main valve element 151 moves in the axial direction when starting the variable displacement compressor, the first valve portion 151a closes the main valve and at the same time, the second valve portion 151b opens the second valve. Further, the pressure-sensitive element 160 contracts due to the suction pressure Ps which is much higher than that in the continuous driving state so as to open the pressure-sensitive valve. Accordingly, a flow path is formed inside the valve housing 110 by the intermediate communication path 155 so as to allow the communication from the third valve chamber 140 to the second valve chamber 130. Further, since the suction pressure Ps of the suction chamber decreases as the variable displacement compressor is started, a high-pressure liquefied fluid in the control chamber moves due to a pressure difference with the suction chamber and passes through the flow path formed inside the valve housing 110 so as to be discharged in a short time.

CITATION LIST

Patent Literature

Patent Citation 1: JP 4700048 B2 (Page 8, FIG. 2)

SUMMARY OF INVENTION

Technical Problem

However, in Patent Citation 1, since the flow path cross-sectional area of the flow path for discharging the liquefied refrigerant in the control chamber is only the opening area of the pressure-sensitive valve when starting the variable displacement compressor, the liquefied fluid is not promptly discharged from the control chamber and some time is spent until the control chamber has a maximum capacity. Further, when all liquefied fluid is discharged so that the control chamber has a maximum capacity after starting the variable displacement compressor, the capacity control valve 100 tries to maintain the control pressure Pc and the suction pressure Ps at the same pressure in order to maintain the maximum capacity state. However, when the suction pressure Ps is low, the pressure-sensitive element 160 does not contract and the pressure-sensitive valve cannot be opened. For this reason, the control pressure Pc and the suction pressure Ps cannot be maintained at the same pressure, a differential pressure is generated between the control pressure Pc and the suction pressure Ps, and the stroke of the piston varies. As a result, since the maximum capacity state of the control chamber cannot be maintained, a problem arises in that operation efficiency decreases.

The present invention has been made in view of such problems and an object of the present invention is to provide a capacity control valve having good responsiveness during start-up and good operation efficiency.

Solution to Problem

In order to solve the foregoing problems, a capacity control valve according to the present invention includes: a valve housing provided with a Pc port and a Pd port; a main valve element which includes a main valve portion coming into contact with and separating from a main valve seat and opens and closes a communication between the Pd port through which a discharge fluid of a discharge pressure passes and the Pc port through which a control fluid of a control pressure passes by a drive force of a solenoid; an intermediate communication path which is able to communicate the Pc port with the Ps port through which a suction fluid of a suction pressure passes; and a pressure-sensitive valve capable opening and closing the intermediate communication path, in which the valve housing has a differential pressure valve housed therein, the differential pressure valve including a differential pressure valve element and being capable of opening and closing a communication between the Pc port and the Ps port by the differential pressure valve element moved by an operation force of an operation member operated by a discharge pressure from the Pd port.

According to the aforesaid feature of the present invention, when starting the variable displacement compressor, the pressure-sensitive valve is opened so as to open the intermediate communication path and the differential pressure valve is opened so as to allow the communication of the differential pressure communication path communicating the Pc port with the Ps port. Accordingly, since a liquefied fluid is discharged from the inside of the control chamber into the suction chamber through the pressure-sensitive valve and the differential pressure valve in a short time, the responsiveness during start-up can be increased. On the other hand, after operating the variable displacement compressor, the differential pressure valve is opened by the differential pressure between the control pressure and the discharge pressure so as to allow the communication of the differential pressure communication path communicating the Pc port with the Ps port even when the pressure-sensitive valve is closed in accordance with a decrease in the suction pressure.

Accordingly, since the control pressure and the suction pressure can be maintained at the same pressure, the maximum capacity state can be maintained and the operation efficiency can be increased.

It might be preferable that the operation member is provided with a Pc pressure receiving surface receiving a pressure from a pressure-sensitive chamber and a Pd pressure receiving surface receiving the discharge pressure, the Pc pressure receiving surface and the Pd pressure receiving surface being arranged so as to be opposite to each other. According to this configuration, since the Pc pressure receiving surface and the Pd pressure receiving surface is opposite to each other, the inclination of the operation member is difficult and the movement of the operation member can be smooth.

It might be preferable that the operation member is formed as a member separated from the differential pressure valve element. According to this configuration, the assembling workability is good and the inclination of each of the operation member and the differential pressure valve element can be prevented.

It might be preferable that the operation member is disposed in a through-hole formed in the valve housing and the differential pressure valve comes into contact with a wall portion of the Pd port when the differential pressure valve element moves in a valve closing direction of the differential pressure valve. According to this configuration, the operation member can be held at a desired position and the movement of the differential pressure valve element can be also regulated by the operation member.

It might be preferable that the differential pressure valve element is formed in a cylindrical shape and is arranged on an outer radial side of the pressure-sensitive valve in concentric relationship with the pressure-sensitive valve. According to this configuration, the capacity control valve with the differential pressure valve can be made compact.

It might be preferable that the capacity control valve further includes a spring configured to urge the differential pressure valve element in a valve closing direction of the differential pressure valve. According to this configuration, when the discharge pressure is low, the differential pressure valve element can be reliably moved to a valve closing position.

It might be preferable that the valve housing includes a first valve housing member accommodating the main valve element and a second valve housing member accommodating a pressure-sensitive valve member. According to this configuration, since the differential pressure valve element can be assembled to the second valve housing member, the assembling workability is excellent.

DESCRIPTION OF EMBODIMENTS

A mode for carrying out a capacity control valve according to the present invention will be described below on the basis of embodiments.

Embodiment

A capacity control valve according to an embodiment of the present invention will be described with reference to FIGS. 1 to 5. Hereinafter, the left and right sides as viewed from the front side in FIG. 2 will be described as the left and right sides of the capacity control valve.

A capacity control valve V of the present invention is incorporated in a variable displacement compressor M used in an air conditioning system of an automobile or the like and variably controls a pressure of a working fluid (hereinafter, simply referred to as a "fluid") which is a refrigerant so that a discharge amount of the variable displacement compressor M is controlled to adjust the air conditioning system to a desired cooling capacity.

Figure 1:
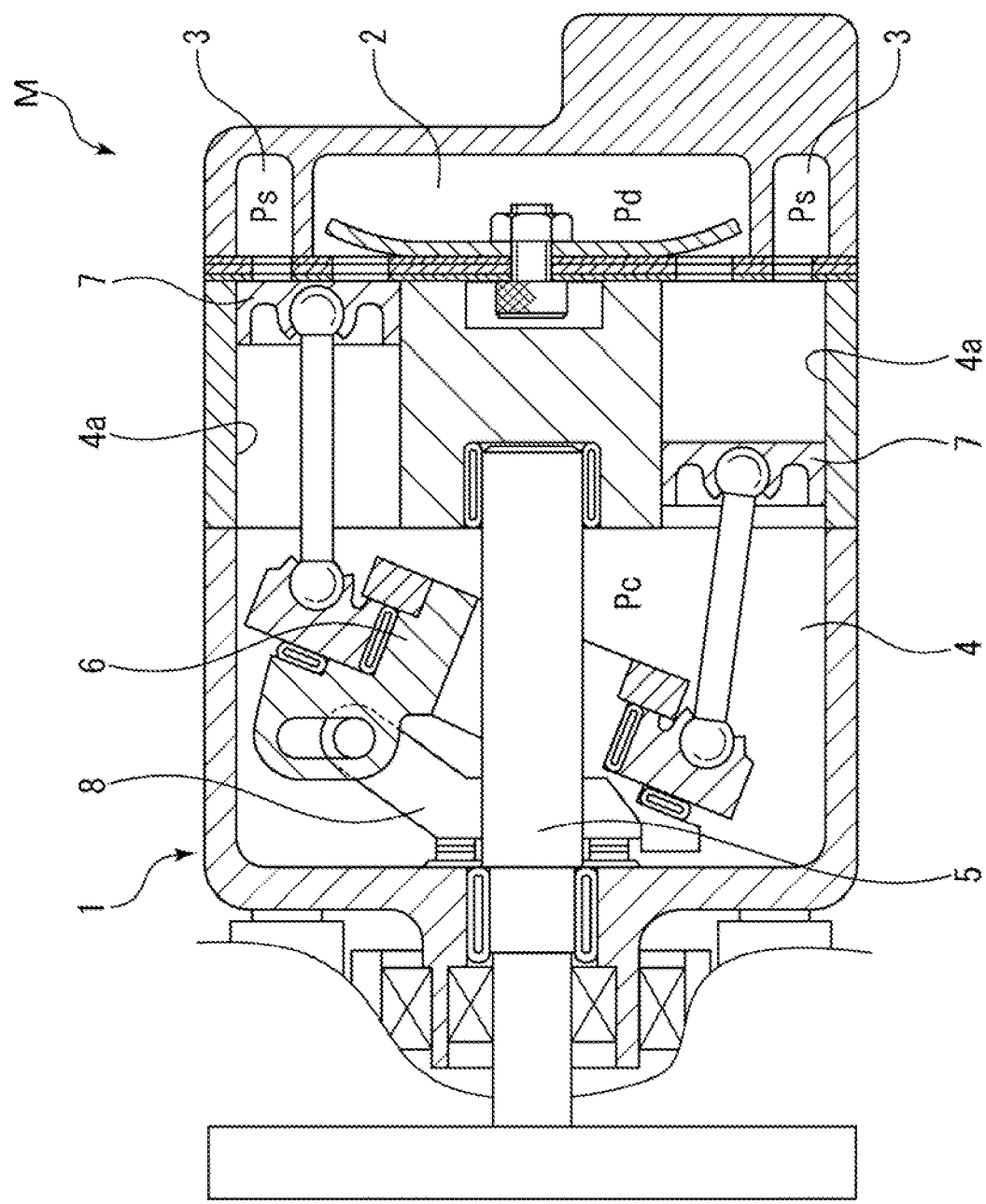
FIG. 1 is a schematic configuration diagram illustrating a swash plate type variable displacement compressor incorporated with a capacity control valve of an embodiment of the present invention.

First, the variable displacement compressor M will be described. As illustrated in FIG. 1, the variable displacement compressor M includes a casing 1 having a discharge chamber 2, a suction chamber 3, a control chamber 4, and a plurality of cylinders 4a. In addition, the variable displacement compressor M is provided with a communication path (not illustrated) allowing the control chamber 4 and the suction chamber 3 to directly communicate with each other and this communication path is provided with a fixed orifice for adjusting a pressure between the suction chamber 3 and the control chamber 4 in a balanced state.

Further, the variable displacement compressor M includes a rotating shaft 5 which is rotationally driven by an engine (not illustrated) installed outside the casing 1, a swash plate 6 which is eccentrically connected to the rotating shaft 5 inside the control chamber 4 by a hinge mechanism 8, and a plurality of pistons 7 which are connected to the swash plate 6 and are fitted so as to be movable in a reciprocating manner inside the respective cylinders 4a and continuously changes an inclination angle of the swash plate 6 by appropriately controlling a pressure inside the control chamber 4 while using a suction pressure Ps of the suction chamber 3 sucking a fluid by using the capacity control valve V driven to be opened and closed by an electromagnetic force, a discharge pressure Pd of the discharge chamber 2 discharging a fluid pressurized by the piston 7, and a control pressure Pc of the control chamber 4 accommodating the swash plate 6 so that a stroke amount of the piston 7 is changed to control a discharge amount of the fluid. Further, for convenience of description, the capacity control valve V incorporated in the variable displacement compressor M is omitted in FIG. 1.

Specifically, the inclination angle of the swash plate 6 with respect to the rotating shaft 5 becomes smaller so that the stroke amount of the piston 7 decreases as the control pressure Pc inside the control chamber 4 becomes higher. However, when the pressure becomes a certain level or more, the swash plate 6 is substantially perpendicular to the rotating shaft 5 (slightly inclined from the vertical direction). At this time, since the stroke amount of the piston 7 is minimized and the pressurization of the fluid inside the cylinder 4a by the piston 7 is minimized, the discharge amount of the fluid to the discharge chamber 2 decreases and the cooling capacity of the air conditioning system is minimized. On the other hand, the inclination angle of the swash plate 6 with respect to the rotating shaft 5 becomes larger so that the stroke amount of the piston 7 increases as the control pressure Pc inside the control chamber 4 becomes lower. However, when the pressure becomes a certain level or less, the inclination angle of the swash plate 6 with respect to the rotating shaft 5 is maximized. At this time, since the stroke amount of the piston 7 is maximized and the pressurization of the fluid inside the cylinder 4a by the piston 7 is maximized, the discharge amount of the fluid to the discharge chamber 2 increases and the cooling capacity of the air conditioning system is maximized.

Figure 2:
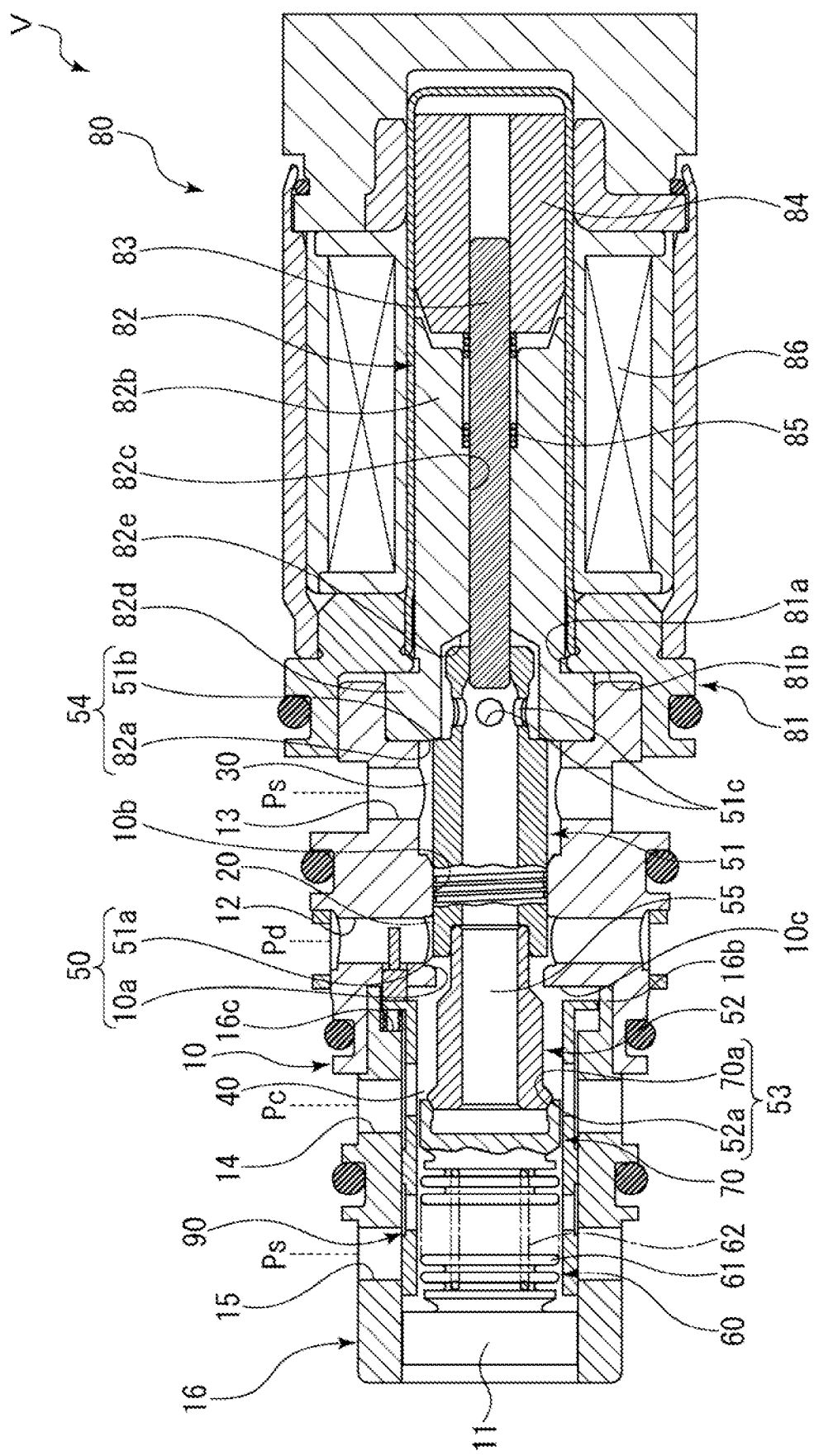
FIG. 2 is a cross-sectional view illustrating a state in which a first valve is opened and a differential pressure valve is opened when the capacity control valve is not energized in the embodiment.

As illustrated in FIG. 2, the capacity control valve V incorporated in the variable displacement compressor M adjusts a current flowing through a coil 86 constituting a solenoid 80 so as to control the opening and closing of a first valve 50 and a second valve 54 which are main valves of the capacity control valve V and to control the opening and closing of a pressure-sensitive valve 53 by an ambient fluid pressure so that the fluid flowing into the control chamber 4 or flowing out from the control chamber 4 is controlled to variably control the control pressure Pc inside the control chamber 4.

In the present embodiment, the first valve 50 includes a main valve element 51 and a first valve seat 10a which is a main valve seat formed on an inner peripheral surface of a first valve housing member 10 corresponding to part of a valve housing and a first valve portion 51a which is a main valve portion formed in a left axial end of the main valve element 51 comes into contact with and separates from the first valve seat 10a. The second valve 54 includes the main valve element 51 and a second valve seat 82a formed in the left axial end surface corresponding to the opening end surface of the fixed iron core 82 and a second valve portion 51b formed in the right axial end of the main valve element 51 comes into contact with and separates from the second valve seat 82a. The pressure-sensitive valve 53 includes an adapter 70 of a pressure-sensitive element 60 and a pressure-sensitive valve seat 52a formed in the left axial end portion of the pressure-sensitive valve member 52 and a right axial end 70a of the adapter 70 comes into contact with and separates from the pressure-sensitive valve seat 52a.

Next, a structure of the capacity control valve V will be described. As illustrated in FIG. 2, the capacity control valve V mainly includes a first valve housing member 10 and a second valve housing member 16 which are valve housings formed of metal material or a resin material, a main valve element 51 which is disposed inside the first valve housing member 10 and the second valve housing member 16 so as to be movable in a reciprocating manner in the axial direction, a pressure-sensitive valve member 52, a pressure-sensitive element 60 which applies an urging force to the main valve element 51 and the pressure-sensitive valve member 52 to the right axial side in response to an ambient fluid pressure, a solenoid 80 which is connected to the first valve housing member 10 and applies a drive force to the main valve element 51 and the pressure-sensitive valve member 52, and a differential pressure valve 90 which is concentrically provided on the outer radial side of the pressure-sensitive element 60. In the present embodiment, the differential pressure valve 90 includes a differential pressure valve portion 91a which is formed in an outer peripheral surface of a differential pressure valve element 91 to be described later and a differential pressure valve seat 16a which is formed in an inner peripheral surface of a second valve housing member 16 to be described later (see FIGS. 3 to 5).

As illustrated in FIG. 2, the solenoid 80 mainly includes a casing 81 which has an opening portion 81a opening leftward in the axial direction, a substantially cylindrical fixed iron core 82 which is inserted into the opening portion 81a of the casing 81 from the left side in the axial direction and is fixed to the inner radial side of the casing 81, a drive rod 83 which is fixed to the inner radial side of the fixed iron core 82 so as to be movable in a reciprocating manner in the axial direction and of which a left axial end portion is connected and fixed to the main valve element 51, a movable iron core 84 which is fixed to a right axial end portion of the drive rod 83, a coil spring 85 which is provided between the fixed iron core 82 and the movable iron core 84 and urges the movable iron core 84 rightward in the axial direction, and an excitation coil 86 which is wound on the outside of the fixed iron core 82 through a bobbin.

The casing 81 is provided with a concave portion 81b which is recessed rightward in the axial direction from the radial center of the left axial end and the right axial end portion of the first valve housing member 10 is inserted and fixed to the concave portion 81b.

The fixed iron core 82 includes a cylindrical portion 82b which is formed of a rigid body corresponding to a magnetic material such as iron or silicon steel and is provided with an insertion hole 82c extending in the axial direction and allowing the drive rod 83 to be inserted therethrough and an annular flange portion 82d which extends outward in the radial direction from the outer peripheral surface of the left axial end portion of the cylindrical portion 82b and a concave portion 82e is formed so as to be recessed rightward in the axial direction from the radial center of the left axial end of the cylindrical portion 82b.

As illustrated in FIG. 2, the first valve housing member 10 is provided with a concave portion 10c which is recessed from the radial center of the left axial end to the right axial side and an insertion-fitting portion 16b formed in the right axial end portion of the second valve housing member 16 is inserted and fitted from the left axial side so as to be connected together in a sealed state. The second valve housing member 16 has a substantially cylindrical shape with a bottom by press-inserting a partition adjustment member 11 into the left axial end portion.

The main valve element 51 and the pressure-sensitive valve member 52 are disposed inside the first valve housing member 10 and the second valve housing member 16 so as to be movable in a reciprocating manner in the axial direction and a part of the inner peripheral surface of the first valve housing member 10 is provided with a small-diameter guide surface 10b on which the outer peripheral surface of the main valve element 51 is slidable. In addition, the partition adjustment member 11 can adjust the urging force of the pressure-sensitive element 60 by adjusting the installation position of the second valve housing member 16 in the axial direction.

Further, a first valve chamber 20 in which the side of the first valve portion 51a of the main valve element 51 is disposed and a second valve chamber 30 which is formed on the right axial side corresponding to the back pressure side of the main valve element 51 are formed inside the first valve housing member 10. Further, a pressure-sensitive chamber 40 which is formed at a position on the side opposite to the second valve chamber 30 with respect to the first valve chamber 20 of the first valve housing member 10 is formed inside the second valve housing member 16. In addition, the second valve chamber 30 is defined by the outer peripheral surface on the back pressure side of the main valve element 51, a concave portion 82e and a left axial end surface corresponding to an opening end surface of the fixed iron core 82, and an inner peripheral surface on the right axial side in relation to the guide surface 10b of the first valve housing member 10.

Further, the first valve housing member 10 is provided with a Pd port 12 which communicates the first valve chamber 20 with the discharge chamber 2 of the variable displacement compressor M and a first Ps port 13 which communicates the second valve chamber 30 with the suction chamber 3 of the variable displacement compressor M. The Pd port 12 is provided with a through-hole 12a (see FIGS. 3 to 5) which extends from the inner peripheral surface of the left axial side to the left axial side and communicates with the pressure-sensitive chamber 40 and a Pd piston 93 (see FIGS. 3 to 5) which is an operation member to be described later is inserted through the through-hole 12a so as to be movable in the axial direction.

Further, the second valve housing member 16 is provided with a Pc port 14 which communicates the pressure-sensitive chamber 40 with the control chamber 4 of the variable displacement compressor M and a second Ps port 15 which is a Ps port provided adjacent to the left axial side of the Pc port 14 and communicating the pressure-sensitive chamber 40 with the suction chamber 3 of the variable displacement compressor M. Further, the second valve housing member 16 is provided with a concave portion 16c which is recessed from the radial center of the right axial end of the insertion-fitting portion 16b to the left axial side and the insertion-fitting portion 16b has a stepped cylindrical shape on the inner radial side. In addition, the concave portion 16c forms a part of the pressure-sensitive chamber 40 and in a state in which the first valve housing member 10 is connected to the second valve housing member 16, the left axial end portion of the Pd piston 93 protruding from the opening on the left axial side of the through-hole 12a is movable forward and backward in the axial direction.

As illustrated in FIG. 2, the main valve element 51 is formed in a substantially cylindrical shape, the pressure-sensitive valve member 52 having a substantially cylindrical shape and a substantially turret shape in the side view is connected and fixed to the left axial end portion, the drive rod 83 is connected and fixed to the right axial end portion, and these components are moved in the axial direction together. Further, an intermediate communication path 55 which penetrates in the axial direction by connecting hollow holes is formed inside the main valve element 51 and the pressure-sensitive valve member 52. In addition, the intermediate communication path 55 communicates with the second valve chamber 30 through a plurality of through-holes 51c penetrating the right axial end portion of the main valve element 51 in the radial direction.

As illustrated in FIG. 2, the pressure-sensitive element 60 mainly includes the bellows core 61 in which the coil spring 62 is embedded and the adapter 70 which is formed in the right axial end portion of the bellows core 61 and the left axial end of the bellows core 61 is fixed to the partition adjustment member 11.

Further, the pressure-sensitive element 60 is disposed inside the pressure-sensitive chamber 40 and the right axial end 70a of the adapter 70 sits on the pressure-sensitive valve seat 52a of the pressure-sensitive valve member 52 by the urging force of the coil spring 62 and the bellows core 61. In addition, the pressure-sensitive element 60 contracts by an ambient fluid pressure when the suction pressure Ps inside the intermediate communication path 55 is high and the pressure-sensitive valve 53 is opened by operating the right axial end 70a of the adapter 70 to be separated from the pressure-sensitive valve seat 52a of the pressure-sensitive valve member 52 (not illustrated). Accordingly, for example, when the suction pressure Ps inside the second valve chamber 30 is high, the control pressure Pc can be promptly released to the second valve chamber 30 through the intermediate communication path 55 and the through-hole 51c of the main valve element 51.

Figure 3:
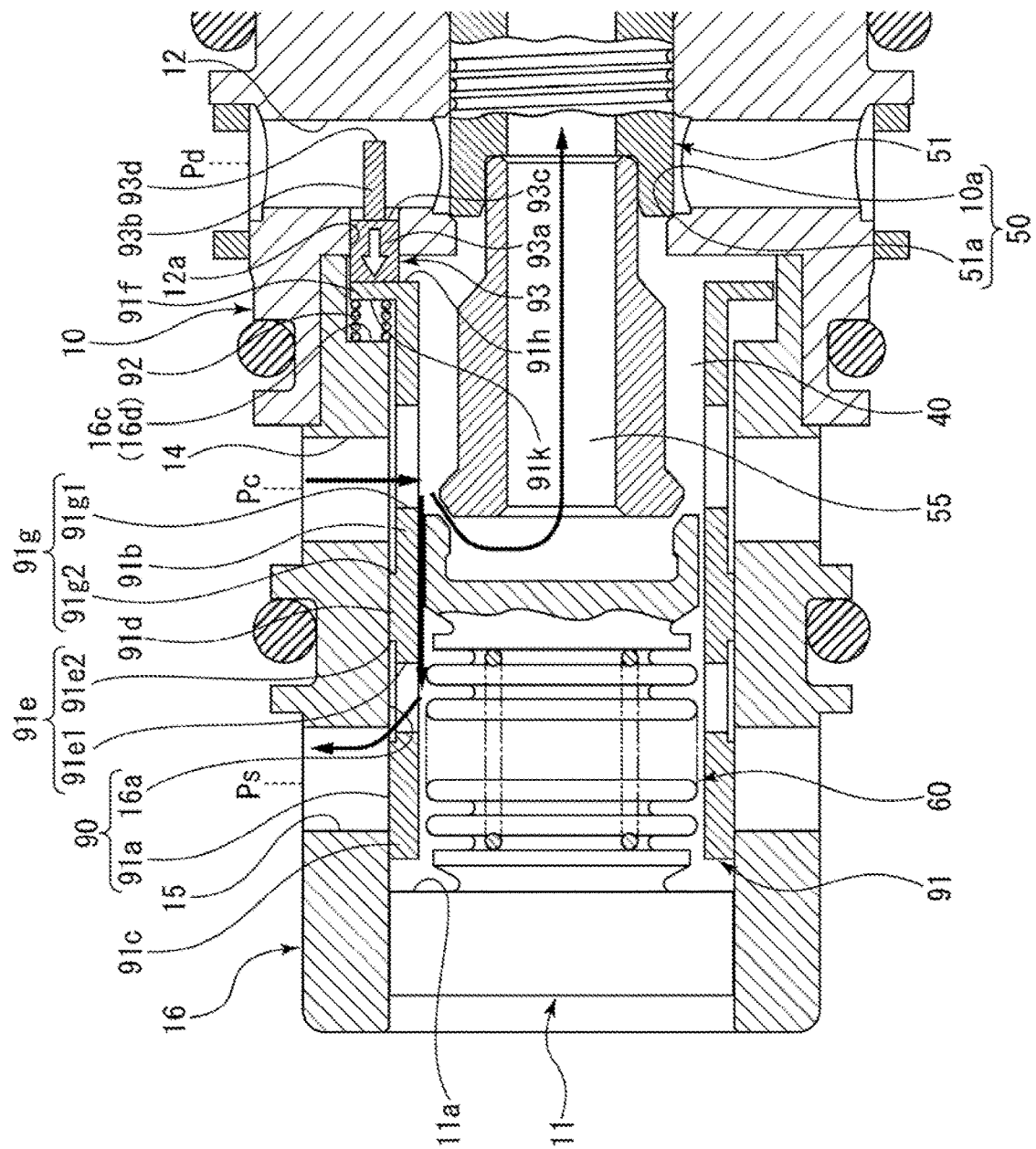
FIG. 3 is an enlarged cross-sectional view illustrating a state in which a first valve is closed and a pressure-sensitive valve and a differential pressure valve are opened when the capacity control valve is energized (e.g., started) in the embodiment.
Figure 4:
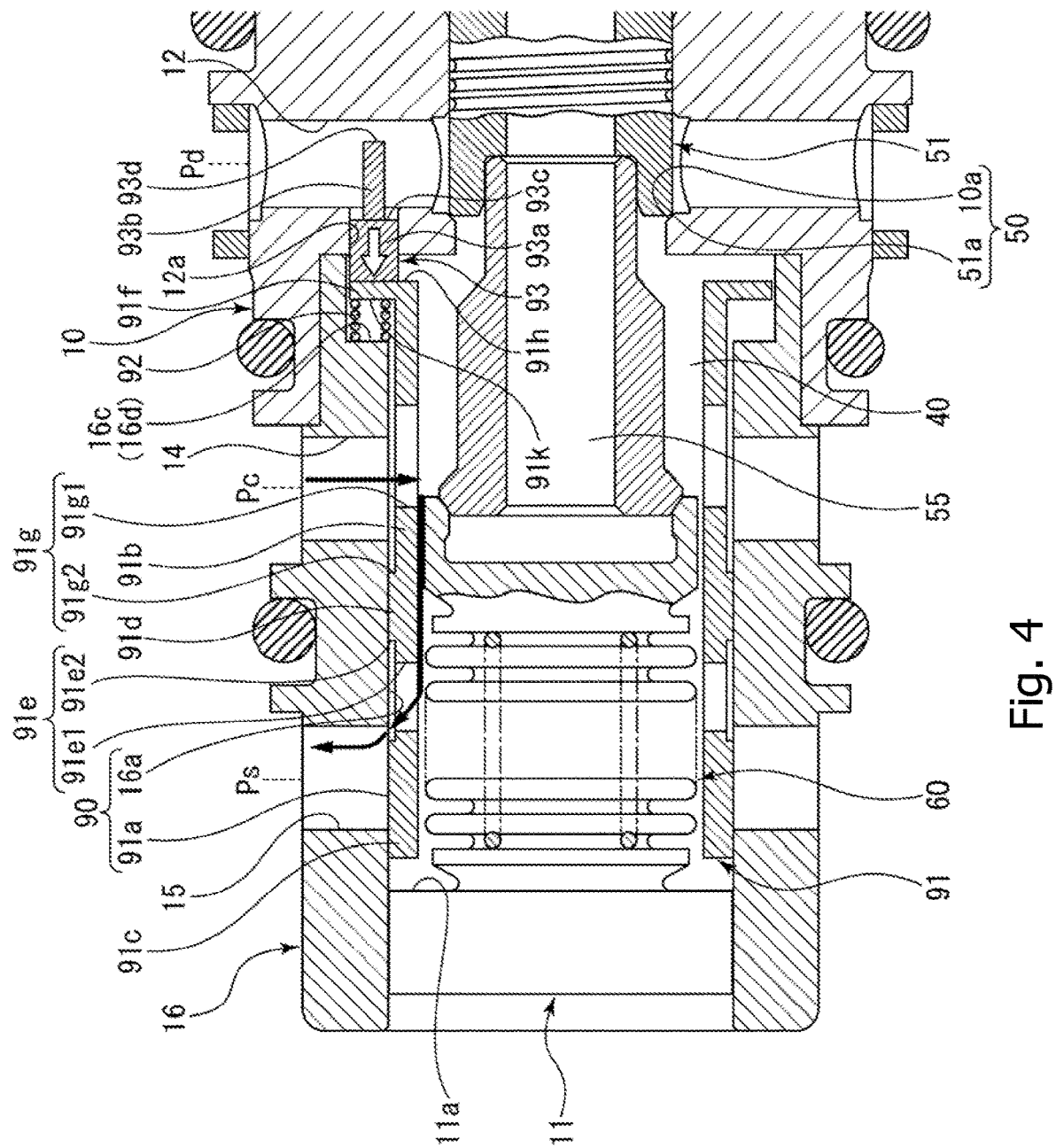
FIG. 4 is an enlarged cross-sectional view illustrating a state in which a pressure-sensitive valve is closed and a differential pressure valve is opened when the capacity control valve is energized (e.g., started) in the embodiment.
Figure 5:
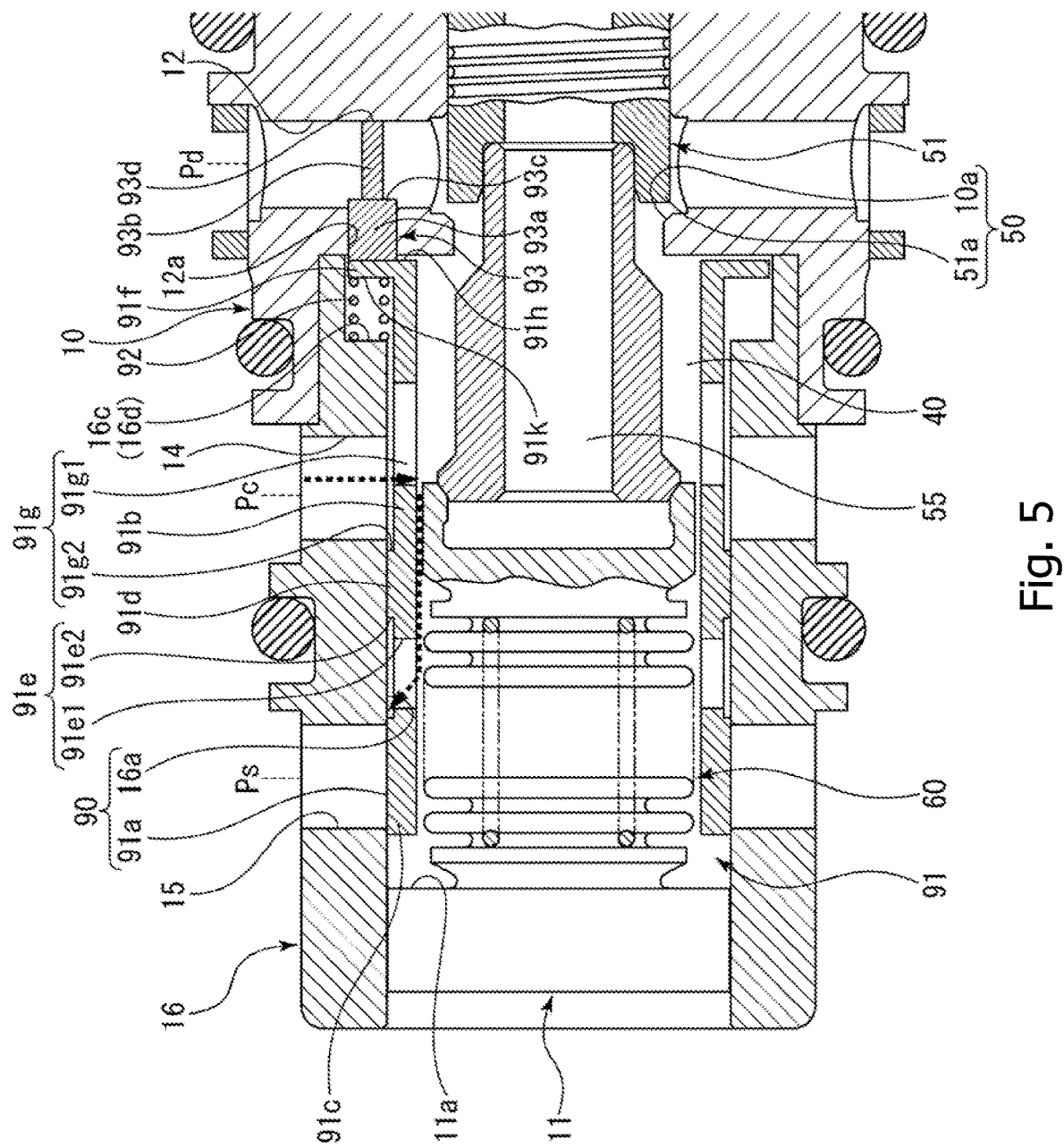
FIG. 5 is an enlarged cross-sectional view illustrating a state in which a first valve is opened and a differential pressure valve is closed when the capacity control valve is energized (e.g., during normal control) in the embodiment.

As illustrated in FIGS. 3 to 5, the differential pressure valve element 91 is formed in a substantially cylindrical shape with a flange and is disposed inside the pressure-sensitive chamber 40 concentrically on the outer radial side of the pressure-sensitive element 60. Further, the differential pressure valve element 91 is provided with an annular flange portion 91f which extends outward in the radial direction from an outer peripheral surface of a right axial end portion of a small-diameter base portion 91b. A left axial end surface of a base portion 93a of the Pd piston 93 comes into contact with a right axial end surface portion 91h of the flange portion 91f, a right axial end of a coil spring 92 which is a spring disposed on the extension line of the radial center of the base portion 93a of the Pd piston 93 comes into contact with a left axial end surface portion 91k, and a left axial end of the coil spring 92 comes into contact with a bottom surface portion 16d of the concave portion 16c of the second valve housing member 16. In addition, for convenience of description, although not illustrated in the drawings, the plurality of coil springs 92 are equally arranged in the circumferential direction between the end surface portion 91k which is the Pc pressure receiving surface on the left axial side of the flange portion 91f and the bottom surface portion 16d of the concave portion 16c of the second valve housing member 16. Further, at least one axial end of the coil spring 92 is fixed to the left axial end surface portion 91k of the flange portion 91f or the bottom surface portion 16d of the concave portion 16c of the second valve housing member 16.

Further, the differential pressure valve element 91 includes the small-diameter base portion 91b having a substantially cylindrical shape, a large-diameter sliding portion 91c formed in the left axial end portion of the base portion 91b, and an annular convex portion 91d formed at the substantially axial center of the base portion 91b so as to protrude outward in the radial direction from the outer peripheral surface of the base portion 91b and to have the same outer diameter as that of the sliding portion 91c and is urged to the right axial side corresponding to the valve closing direction of the differential pressure valve 90 by the coil spring 92 disposed between the bottom surface portion 16d of the concave portion 16c of the second valve housing member 16 and the left axial end surface of the flange portion 91f.

Further, the differential pressure valve element 91 is provided with a first through-hole 91e which penetrates therethrough in the radial direction of the base portion 91b between the sliding portion 91c and the annular convex portion 91d and a second through-hole 91g which penetrates therethrough in the radial direction of the base portion 91b between the annular convex portion 91d and the flange portion 91f. In the first through-hole 91e, an outer radial large-diameter hole portion 91e2 is connected to an inner radial small-diameter hole portion 91e1 and the large-diameter hole portion 91e2 extends toward both sides in the axial direction from the small-diameter hole portion 91e1. Accordingly, the first through-hole 91e easily communicates with the second Ps port 15. Similarly, in the second through-hole 91g, an outer radial large-diameter hole portion 91g2 is connected to an inner radial small-diameter hole portion 91g1 and the large-diameter hole portion 91g2 extends to both sides in the axial direction from the small-diameter hole portion 91g1. Accordingly, the second through-hole 91g easily communicates with the Pc port 14. Further, since the large-diameter hole portion 91g2 communicates with a space between the left axial end surface portion 91k of the flange portion 91f and the bottom surface portion 16d of the concave portion 16c of the second valve housing member 16, the control pressure Pc is easily led to the flange portion 91f. In addition, the outer peripheral surfaces of the sliding portion 91c and the annular convex portion 91d are slightly separated from the inner peripheral surface of the second valve housing member 16 in the radial direction so that a minute gap is formed therebetween and the differential pressure valve element 91 can smoothly move in the axial direction.

Further, the right axial end portion of the outer peripheral surface of the sliding portion 91c is provided with the differential pressure valve portion 91a which axially slides on the differential pressure valve seat 16a formed in the inner peripheral surface of the second valve housing member 16 on the right axial side in relation to the second Ps port 15. Further, the left axial end portion of the outer peripheral surface of the sliding portion 91c is formed so as to always slide on the inner peripheral surface of the second valve housing member 16 on the left axial side in relation to the second Ps port 15 when opening and closing the differential pressure valve 90.

Further, the second through-hole 91g formed in the base portion 91b has substantially the same opening area as that of the Pc port 14 formed in the second valve housing member 16 and is disposed so that the axial positions correspond to each other.

As illustrated in FIGS. 3 to 5, the Pd piston 93 includes the base portion 93a which is formed in a columnar shape extending in the axial direction and a small-diameter regulation portion 93b which extends to the right axial side from the radial center of the end surface portion 93c corresponding to the Pd pressure receiving surface formed in the right axial end of the base portion 93a so that the right axial end portion is disposed inside the Pd port 12.

Further, the Pd piston 93 is provided with an end surface portion 93d which is a Pd pressure receiving surface capable of coming into contact with the right axial wall portion of the Pd port 12 when closing the differential pressure valve 90. In addition, in the Pd piston 93, since the end surface portion 93d of the regulation portion 93b comes into contact with the right axial wall portion of the Pd port 12, the differential pressure valve element 91 and the Pd piston 93 are prevented from falling into the Pd port 12. Further, since the regulation portion 93b has a small diameter, the flow of the fluid inside the Pd port 12 is not disturbed.

Further, the capacity control valve V can be assembled in such a manner that the Pd piston 93 is inserted from the left axial opening of the through-hole 12a of the first valve housing member 10, the differential pressure valve element 91 is inserted from the right axial end of the second valve housing member 16 while the coil spring 92 is disposed between the left axial end surface portion 91k of the flange portion 91f of the differential pressure valve element 91 and the bottom surface portion 16d of the concave portion 16c of the second valve housing member 16, the first valve housing member 10 and the second valve housing member 16 are connected to each other, the pressure-sensitive element 60 is inserted from the left axial end of the second valve housing member 16 into the pressure-sensitive chamber 40, and the partition adjustment member 11 is press-inserted so as to fix the entire components. In addition, the differential pressure valve element 91 and the Pd piston 93 may be integrally formed with each other.

Next, an opening and closing mechanism of the differential pressure valve 90 will be described. In a state in which the discharge pressure Pd applied from the right axial side to the end surface portion 93d of the right axial end of the regulation portion 93b and the end surface portion 93c of the right axial end of the base portion 93a of the Pd piston 93 is low, the differential pressure valve element 91 moves to the right axial side by receiving the urging force of the coil spring 92 and the differential pressure valve portion 91a slides on the differential pressure valve seat 16a so that the differential pressure valve 90 is closed (see FIG. 5).

On the other hand, in a state in which the discharge pressure Pd applied from the right axial side of the end surface portion 93d of the right axial end of the regulation portion 93b and the end surface portion 93c of the right axial end of the base portion 93a of the Pd piston 93 is high, a force (indicated by a white arrow in FIGS. 3 and 4) is applied to the Pd piston 93 to the left axial side so that the differential pressure valve element 91 moves to the left axial side against the urging force of the coil spring 92 and the differential pressure valve 90 is opened (see FIGS. 3 and 4).

Next, a case in which the non-energized state of the capacity control valve V is maintained will be described. As illustrated in FIG. 2, when the capacity control valve V is in the non-energized state, the movable iron core 84 is pressed to the right axial side by the urging force of the coil spring 85 constituting the solenoid 80 or the urging force of the coil spring 62 and the bellows core 61, the drive rod 83, the main valve element 51, and the pressure-sensitive valve member 52 move the right axial side, the second valve portion 51b of the main valve element 51 sits on the second valve seat 82a of the fixed iron core 82 so as to close the second valve 54, and the first valve portion 51a of the main valve element 51 is separated from the first valve seat 10a formed in the inner peripheral surface of the first valve housing member 10 so as to open the first valve 50. In addition, FIG. 2 illustrates a state in which the differential pressure valve 90 is opened by the high discharge pressure Pd.

In this way, when the capacity control valve V is in the non-energized state, a fluid inside the discharge chamber 2 of the variable displacement compressor M flows from the discharge chamber 2 into the control chamber 4 through the capacity control valve V when the first valve 50 is opened. This is because the discharge pressure Pd is higher than the control pressure Pc.

Since the discharge pressure Pd flows into the control chamber 4, the control pressure Pc is higher than the control pressure Pc before the non-energized state, is higher than the suction pressure Ps, and is expressed by a relational expression of Ps<Pc≤Pd. For that reason, a fluid inside the control chamber 4 flows into the suction chamber 3 through the communication path and the fixed orifice directly communicating the control chamber 4 with the suction chamber 3. The inflow of the fluid is performed until the discharge pressure Pd, the suction pressure Ps, and the control pressure Pc are equalized. For that reason, when the capacity control valve V is left in the non-energized state for a long time, the discharge pressure Pd, the suction pressure Ps, and the control pressure Pc are equalized (Ps=Pc=Pd) and the suction pressure Ps and the control pressure Pc are much higher than the pressure in the continuous driving state. At this time, a part of the fluid inside the control chamber 4 is liquefied. In addition, since the control pressure Pc of the control chamber 4 and the suction pressure Ps of the suction chamber 3 are balanced and equalized, a flow of a fluid from the Pc port 14 to the second Ps port 15 inside the pressure-sensitive chamber 40 disappears.

Since the discharge amount of the variable displacement compressor M cannot be appropriately controlled at the control pressure Pc which is much higher than that in the continuous driving state, it is necessary to decrease the control pressure Pc by discharging the liquefied fluid from the inside of the control chamber 4.

Next, a case until a liquefied fluid is discharged from the control chamber 4 when starting the variable displacement compressor M will be described.

When the variable displacement compressor M is started while the discharge pressure Pd, the suction pressure Ps, and the control pressure Pc are equalized, the swash plate 6 is substantially perpendicular to the rotating shaft 5 and the stroke amount of the piston 7 is minimized since the control pressure Pc at this time is much higher than the control pressure Pc in the continuous driving state. Further, the variable displacement compressor M starts the energizing to the capacity control valve V in accordance with the starting thereof.

When the coil 86 of the solenoid 80 is energized and excited to generate a magnetic force from the non-energized state of the capacity control valve V (a state in which the first valve 50 is opened), the movable iron core 84 is sucked to the fixed iron core 82 that receives the magnetic force, the drive rod 83 of which the right axial end portion is connected to the movable iron core 84 moves in a following manner, and the main valve element 51 connected to the left axial end portion of the drive rod 83 moves to the left axial side (see FIG. 3). At this time, the main valve element 51 and the pressure-sensitive valve member 52 move to the left axial side together.

Accordingly, in the capacity control valve V, as illustrated in FIG. 3, the first valve portion 51a of the main valve element 51 sits on the first valve seat 10a formed in the inner peripheral surface of the first valve housing member 10 so that the first valve 50 is closed. At this time, the second valve portion 51b of the main valve element 51 is separated from the second valve seat 82a formed in the opening end surface of the fixed iron core 82 so that the second valve 54 is opened. In addition, since the pressure-sensitive element 60 contracts due to the suction pressure Ps which is much higher than that in the continuous driving state, the right axial end 70a of the adapter 70 separates from the pressure-sensitive valve seat 52a of the pressure-sensitive valve member 52 so that the pressure-sensitive valve 53 is opened.

Further, since the suction pressure Ps of the suction chamber 3 slightly decreases due to the stroke of the piston 7 when starting the variable displacement compressor M, a pressure difference between the control pressure Pc of the control chamber 4 and the suction pressure Ps of the suction chamber 3 generates a flow of a fluid flowing from the Pc port 14 to the intermediate communication path 55 through the pressure-sensitive valve 53 and flowing to the first Ps port 13 (see FIG. 2) and a flow of a fluid flowing from the Pc port 14 to the second Ps port 15 through the differential pressure valve 90 inside the pressure-sensitive chamber 40.

Accordingly, since the capacity control valve V of the present embodiment can sufficiently secure a flow path cross-sectional area for discharging a liquefied refrigerant of the control chamber 4 by opening the pressure-sensitive valve 53 and the differential pressure valve 90 when starting the variable displacement compressor M and communicating two flow paths communicating the Pc port 14 with the first Ps port 13 and the second Ps port 15, that is, the intermediate communication path 55 and the differential pressure communication path (indicated by a solid arrow in FIG. 3), it is possible to increase responsiveness during start-up by discharging a liquefied fluid from the inside of the control chamber 4 through the pressure-sensitive valve 53 and the differential pressure valve 90.

Further, both the control pressure Pc of the control chamber 4 and the suction pressure Ps of the suction chamber 3 decrease and the liquefied fluid is discharged from the control chamber 4 after starting the variable displacement compressor M.

Further, in the capacity control valve V of the present embodiment, the pressure-sensitive element 60 expands in accordance with a decrease in the suction pressure Ps when the control chamber 4 is in the maximum capacity state, so that the right axial end 70a of the adapter 70 sits on the pressure-sensitive valve seat 52a of the pressure-sensitive valve member 52. Accordingly, even when the suction pressure Ps is low and the pressure-sensitive valve 53 is not opened, the differential pressure valve element 91 and the Pd piston 93 move to the left axial side due to the high pressure of the discharge pressure Pd so that the differential pressure valve 90 is opened and the communication of the differential pressure communication path (indicated by a solid arrow in FIG. 4) from the Pc port 14 to the second Ps port 15 is allowed. Accordingly, the control pressure Pc and the suction pressure Ps can be maintained at the equal pressure (same pressure). For that reason, since the stroke of the piston 7 inside the cylinder 4a of the control chamber 4 is stabilized and the maximum capacity state is maintained, the operation efficiency can be increased.

Further, as illustrated in FIG. 4, in the normal control in which the energized state is maintained so that the first valve 50 is closed, the control pressure Pc in the pressure-sensitive chamber 40 is maintained at the pressure (same pressure) equal to the suction pressure Ps which is lower than the discharge pressure Pd. Accordingly, a differential pressure is generated between the discharge pressure Pd applied from the right axial side to the Pd pressure receiving surface (mainly the end surface portion 93c) of the Pd piston 93 and the control pressure Pc applied from the left axial side to the end surface portion 91k corresponding to the Pc pressure receiving surface of the differential pressure valve element 91 disposed to face the Pd pressure receiving surface and a force (indicated by a white arrow in FIG. 4) generated by the discharge pressure Pd is applied to the differential pressure valve element 91 to the left axial side against the urging force of the coil spring 92. For this reason, the differential pressure valve 90 can be easily maintained in the open state during the normal control.

Further, in the normal control, when the energized state is switched to the non-energized state so that the first valve 50 is opened, the discharge pressure Pd flows from the discharge chamber 2 into the capacity control valve V so that the discharge pressure Pd in the Pd port 12 decreases and the control pressure Pc of the pressure-sensitive chamber 40 increases. For this reason, the differential pressure valve element 91 and the Pd piston 93 move to the right axial side by the urging force of the coil spring 92 so that the differential pressure valve 90 is closed (indicated by a dotted arrow in FIG. 5). Accordingly, since the leakage of the fluid from the Pc port 14 to the second Ps port 15 can be prevented, the control accuracy of the control pressure Pc using the capacity control valve V can be increased.

Further, since the end surface portion 93d of the right axial end of the regulation portion 93b and the end surface portion 93c of the right axial end of the base portion 93a of the Pd piston 93 receiving the discharge pressure Pd from the right axial side are disposed so as to face the left axial end surface portion 91k of the flange portion 91f of the differential pressure valve element 91 receiving the control pressure Pc from the pressure-sensitive chamber 40 in the axial direction, the inclination of the Pd piston 93 is difficult and the axial movement of the Pd piston 93 is smooth. Further, since the Pd piston 93 is configured as a member separated from the differential pressure valve element 91, the assembling workability is good and the inclination of each of the Pd piston 93 and the differential pressure valve element 91 is difficult.

Further, since the Pd piston 93 is disposed in the through-hole 12a of the first valve housing member 10 and the right axial end surface portion 93d of the regulation portion 93b comes into contact with the right axial wall portion of the Pd port 12 when the differential pressure valve 90 moves in the valve closing direction, the Pd piston 93 can be held at a desired position and the movement of the differential pressure valve element 91 can be also regulated by the Pd piston 93.

Further, since the substantially cylindrical differential pressure valve element 91 constituting the differential pressure valve 90 is provided concentrically on the outer radial side of the pressure-sensitive valve 53 (the pressure-sensitive element 60), the capacity control valve V having the differential pressure valve 90 can be made compact.

Further, since the coil spring 92 which urges the differential pressure valve element 91 and the Pd piston 93 to the right axial side corresponding to the valve closing direction is provided, the differential pressure valve element 91 can be reliably moved to the valve closing position when the discharge pressure Pd is low.

Further, since the valve housing includes the first valve housing member 10 accommodating the main valve element 51 and the second valve housing member 16 accommodating the pressure-sensitive valve member 52 and the differential pressure valve element 91 may be assembled to the second valve housing member 16, the assembling workability is excellent.

Further, since the differential pressure valve element 91 can stably perform the opening and closing operation of the differential pressure valve 90 by guiding the outer peripheral surfaces of the sliding portion 91c and the annular convex portion 91d on the inner peripheral surface of the second valve housing member 16, the structure of the differential pressure valve 90 can be simplified.

Further, since the second valve housing member 16 is provided with the second Ps port 15 that communicates with the suction chamber 3 and constitutes the differential pressure communication path (indicated by a solid arrow in FIG. 5) opened and closed by the differential pressure valve 90 separately from the first Ps port 13 communicating with the suction chamber 3 through the intermediate communication path 55 by opening and closing the pressure-sensitive valve 53, the first valve housing member 10 and the second valve housing member 16 can have a simple structure.

Although the embodiments of the present invention have been described above with reference to the drawings, a detailed configuration is not limited to these embodiments and modifications or additions in the scope not departing from the spirit of the present invention are also included in the present invention.

For example, as in the above-described embodiment, the communication path and the fixed orifice which directly communicate the control chamber 4 and the suction chamber 3 of the variable displacement compressor M with each other may not be provided.

Further, in the above-described embodiments, the second valve may not be provided and the second valve portion of the main valve element may function as a support member that receives an axial load and does not essentially need a sealing function.

Further, the differential pressure valve and the Pc port may be provided inside the second valve chamber.

Further, the second valve chamber 30 may be provided on the side opposite to the solenoid 80 in the axial direction and the pressure-sensitive chamber 40 may be provided on the side of the solenoid 80.

Further, a case has been described such that the discharge pressure Pd, the suction pressure Ps, and the control pressure Pc are equalized when the variable displacement compressor M is left for a long time, but the present invention is not limited thereto. For example, only the suction pressure Ps may be slightly low at all times.

Further, the first valve housing member 10 and the second valve housing member 16 may be integrally formed with each other.

Further, the movement of the differential pressure valve element 91 may be regulated by the Pd piston 93 and/or the valve housing (e.g., the first valve housing member 10 or the second valve housing member 16) when closing the differential pressure valve 90.

Figure 6A:
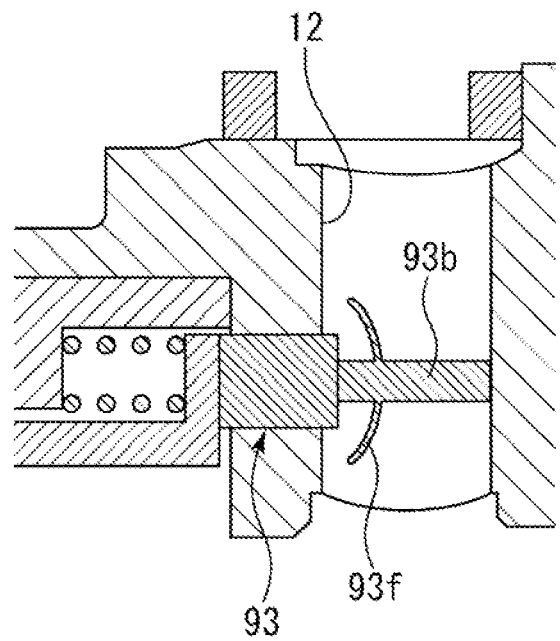
FIGS. 6A and 6B are enlarged cross-sectional views illustrating modified examples of a Pd piston.
Figure 6B:
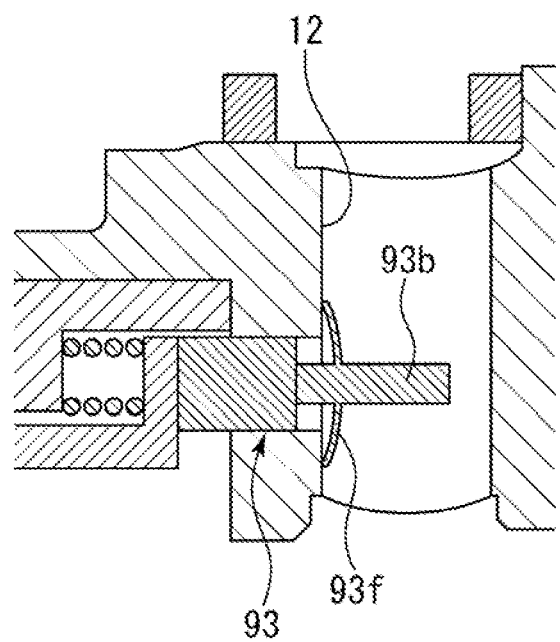
Figure 7:
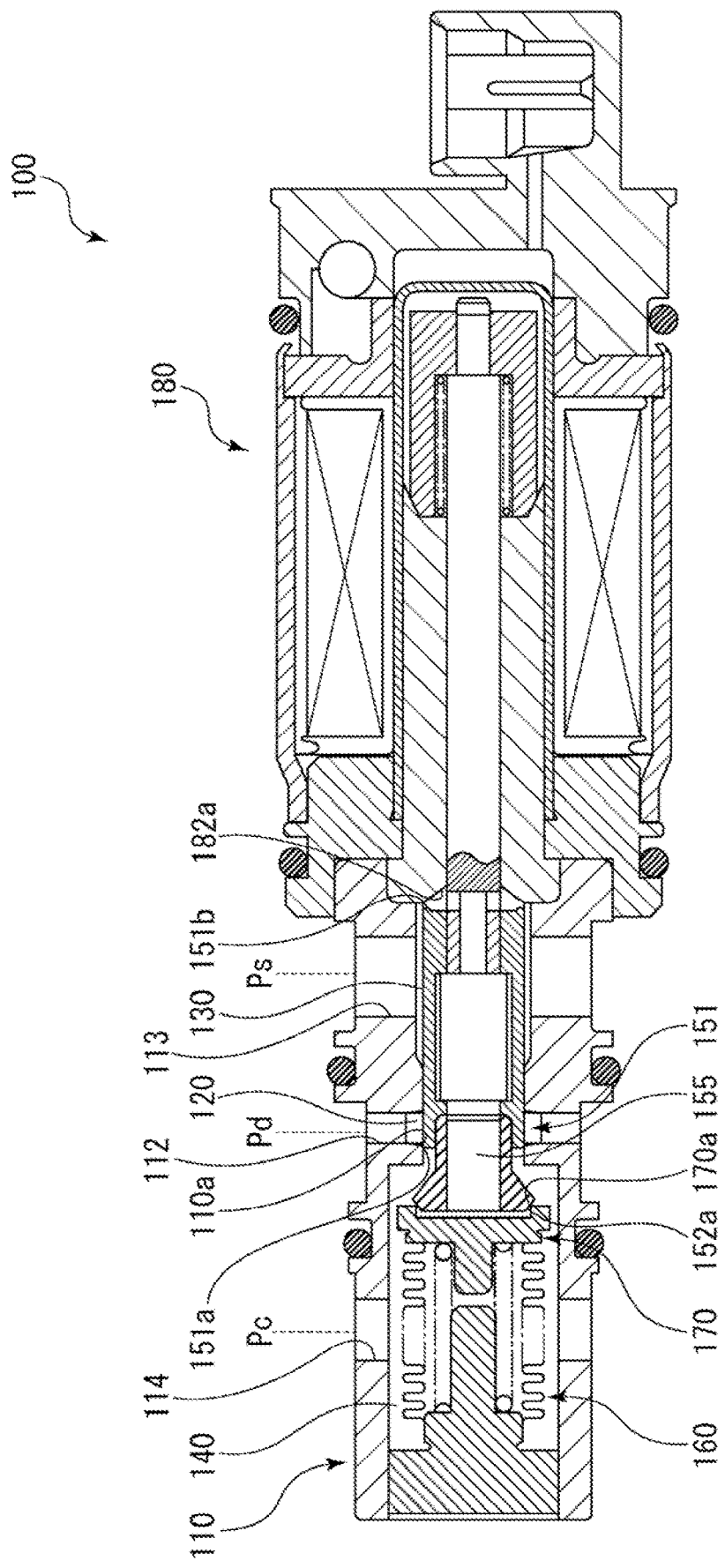
FIG. 7 is a cross-sectional view illustrating a state in which a first valve is closed when a conventional capacity control valve disclosed in Patent Citation 1 is energized.

Further, as illustrated in FIG. 6A, the Pd piston 93 may be provided with a plate-shaped umbrella portion 93f formed in the small-diameter regulation portion 93b so as to have a diameter larger than the through-hole 12a. Accordingly, when the Pd piston 93 moves to the left axial side due to the discharge pressure Pd, the umbrella portion 93f comes into contact with the inner surface of the Pd port 12 (see FIG. 6B). Thus, a fluid inside the Pd port 12 hardly leaks to the pressure-sensitive chamber 40 through the through-hole 12a.

Further, one or more Pd pistons 93 may be provided. When a plurality of Pd pistons are provided, the Pd pistons are preferably equally arranged in the circumferential direction so as to correspond to the coil springs 92.

Further, the coil spring 92 is not limited to a compression spring, but may be a tension spring or have a shape other than a coil shape.

Further, the pressure-sensitive element 60 may not use a coil spring therein.

REFERENCE SIGNS LIST

1 Casing
2 Discharge chamber
3 Suction chamber
4 Control chamber
10 First valve housing member (valve housing)
10a First valve seat (main valve seat)
11 Partition adjustment member
12 Pd port
12a Through-hole
13 First Ps port
14 Pc port
15 Second Ps port (Ps port)
16 Second valve housing member (valve housing)
16a Differential pressure valve seat
20 First valve chamber
30 Second valve chamber
40 Pressure-sensitive chamber
50 First valve (main valve)
51 Main valve element
51a First valve portion (main valve portion)
51b Second valve portion
52 Pressure-sensitive valve member
52a Pressure-sensitive valve seat
53 Pressure-sensitive valve
54 Second valve
55 Intermediate communication path
60 Pressure-sensitive element
61 Bellows core
62 Coil spring
70 Adapter
70a Right axial end
80 Solenoid
82 Fixed iron core
82a Second valve seat
90 Differential pressure valve
91 Differential pressure valve element
91a Differential pressure valve portion
91b Base portion
91c Sliding portion
91d Annular convex portion
91e First through-hole
91e1 Small-diameter hole portion
91e2 Large-diameter hole portion
91f Flange portion
91g Second through-hole
91g1 Small-diameter hole portion
91g2 Large-diameter hole portion
91h End surface portion
91k End surface portion (Pc pressure receiving surface)
92 Coil spring (spring)
93 Pd piston (operation member)
93a Base portion
93b Regulation portion
93c End surface portion (Pd pressure receiving surface)
93d End surface portion (Pd pressure receiving surface)
93f Umbrella portion
Pc Control pressure
Pd Discharge pressure
Ps Suction pressure
V Capacity control valve

The invention claimed is:

1. A capacity control valve comprising:
a valve housing provided with a Pc port, a Ps port and a Pd port;
a main valve which includes a main valve portion configured to come into contact with and to separate from a main valve seat and to open and close a communication between the Pd port and the Pc port by a drive force of a solenoid;

an intermediate communication path configured to communicate the Pc port with the Ps port, and
a pressure-sensitive valve configured to open and close the intermediate communication path by an ambient pressure,
wherein the valve housing has a differential pressure valve housed therein, the differential pressure valve including a differential pressure valve element and being configured to open and close a communication between the Pc port and the Ps port by a movement of the differential pressure valve element driven by an operation force of a piston operated by a discharge pressure from the Pd port.

2. The capacity control valve according to claim 1, wherein the piston is provided with a Pc pressure receiving surface configured to receive a pressure from a pressure-sensitive chamber and a Pd pressure receiving surface configured to receive the discharge pressure, the Pc pressure receiving surface and the Pd pressure receiving surface being arranged so as to be opposite to each other.

3. The capacity control valve according to claim 1, wherein the piston is formed as a member separated from the differential pressure valve element.

4. The capacity control valve according to claim 1, wherein the piston is disposed in a through-hole formed in the valve housing and is configured to come into contact with a wall portion of the Pd port when the differential pressure valve element moves in a valve closing direction.

5. The capacity control valve according to claim 1, wherein the differential pressure valve element is formed in a cylindrical shape and is arranged on an outer radial side of the pressure-sensitive valve in a concentric relationship with the pressure-sensitive valve.

6. The capacity control valve according to claim 1, further comprising:
a spring configured to urge the differential pressure valve element in a valve closing direction.

7. The capacity control valve according to claim 1, wherein the valve housing includes a first valve housing configured to accommodate the main valve and a second valve housing configured to accommodate the pressure-sensitive valve.

8. The capacity control valve according to claim 2, wherein the piston is formed as a member separated from the differential pressure valve element.

9. The capacity control valve according to claim 2, wherein the piston is disposed in a through-hole formed in the valve housing and is configured to come into contact with a wall portion of the Pd port when the differential pressure valve element moves in a valve closing direction.

10. The capacity control valve according to claim 2, wherein the differential pressure valve element is formed in a cylindrical shape and is arranged on an outer radial side of the pressure-sensitive valve in a concentric relationship with the pressure-sensitive valve.

11. The capacity control valve according to claim 2, further comprising:
a spring configured to urge the differential pressure valve element in a valve closing direction.

12. The capacity control valve according to claim 2, wherein the valve housing includes a first valve housing configured to accommodate the main valve and a second valve housing configured to accommodate the pressure-sensitive valve.

13. The capacity control valve according to claim 3, wherein the piston is disposed in a through-hole formed in the valve housing and is configured to come into contact with a wall portion of the Pd port when the differential pressure valve element moves in a valve closing direction of the differential pressure valve.

14. The capacity control valve according to claim 3, wherein the differential pressure valve element is formed in a cylindrical shape and is arranged on an outer radial side of the pressure-sensitive valve in a concentric relationship with the pressure-sensitive valve.

15. The capacity control valve according to claim 3, further comprising:
a spring configured to urge the differential pressure valve element in a valve closing direction.

16. The capacity control valve according to claim 3, wherein the valve housing includes a first valve housing configured to accommodate the main valve and a second valve housing configured to accommodate the pressure-sensitive valve.

17. The capacity control valve according to claim 4, wherein the differential pressure valve element is formed in a cylindrical shape and is arranged on an outer radial side of the pressure-sensitive valve in a concentric relationship with the pressure-sensitive valve.

18. The capacity control valve according to claim 4, further comprising:
a spring configured to urge the differential pressure valve element in the valve closing direction.

19. The capacity control valve according to claim 4, wherein the valve housing includes a first valve housing configured to accommodate the main valve and a second valve housing configured to accommodate the pressure-sensitive valve.

20. The capacity control valve according to claim 5, further comprising:
a spring configured to urge the differential pressure valve element in a valve closing direction.

* * * * *